United States Patent
Ross et al.

(10) Patent No.: US 8,220,351 B2
(45) Date of Patent: Jul. 17, 2012

(54) DUAL CLUTCH MULTI-SPEED TRANSMISSION HAVING ONE COUNTERSHAFT AND A REVERSE SHAFT

(75) Inventors: Craig S. Ross, Ypsilanti, MI (US); Edwin T. Grochowski, Howell, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 346 days.

(21) Appl. No.: 12/706,219

(22) Filed: Feb. 16, 2010

(65) Prior Publication Data

US 2010/0236359 A1    Sep. 23, 2010

Related U.S. Application Data

(60) Provisional application No. 61/161,958, filed on Mar. 20, 2009.

(51) Int. Cl.
*F16H 3/08* (2006.01)

(52) U.S. Cl. .......................................................... 74/330
(58) Field of Classification Search ..................... 74/330, 74/331, 333, 340
See application file for complete search history.

(56) References Cited

U.S. PATENT DOCUMENTS

| 4,548,101 | A | * | 10/1985 | Akashi et al. | 74/720 |
| 5,950,781 | A | * | 9/1999 | Adamis et al. | 192/3.61 |
| 7,040,186 | B2 | * | 5/2006 | Pollak | 74/330 |
| 7,428,853 | B2 | * | 9/2008 | Tanba et al. | 74/339 |
| 7,434,487 | B2 | * | 10/2008 | Terai | 74/330 |

* cited by examiner

Primary Examiner — Ha D. Ho

(57) ABSTRACT

A transmission includes an input member, an output transfer gear, first and second shaft members, a countershaft, a reverse shaft, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

18 Claims, 1 Drawing Sheet

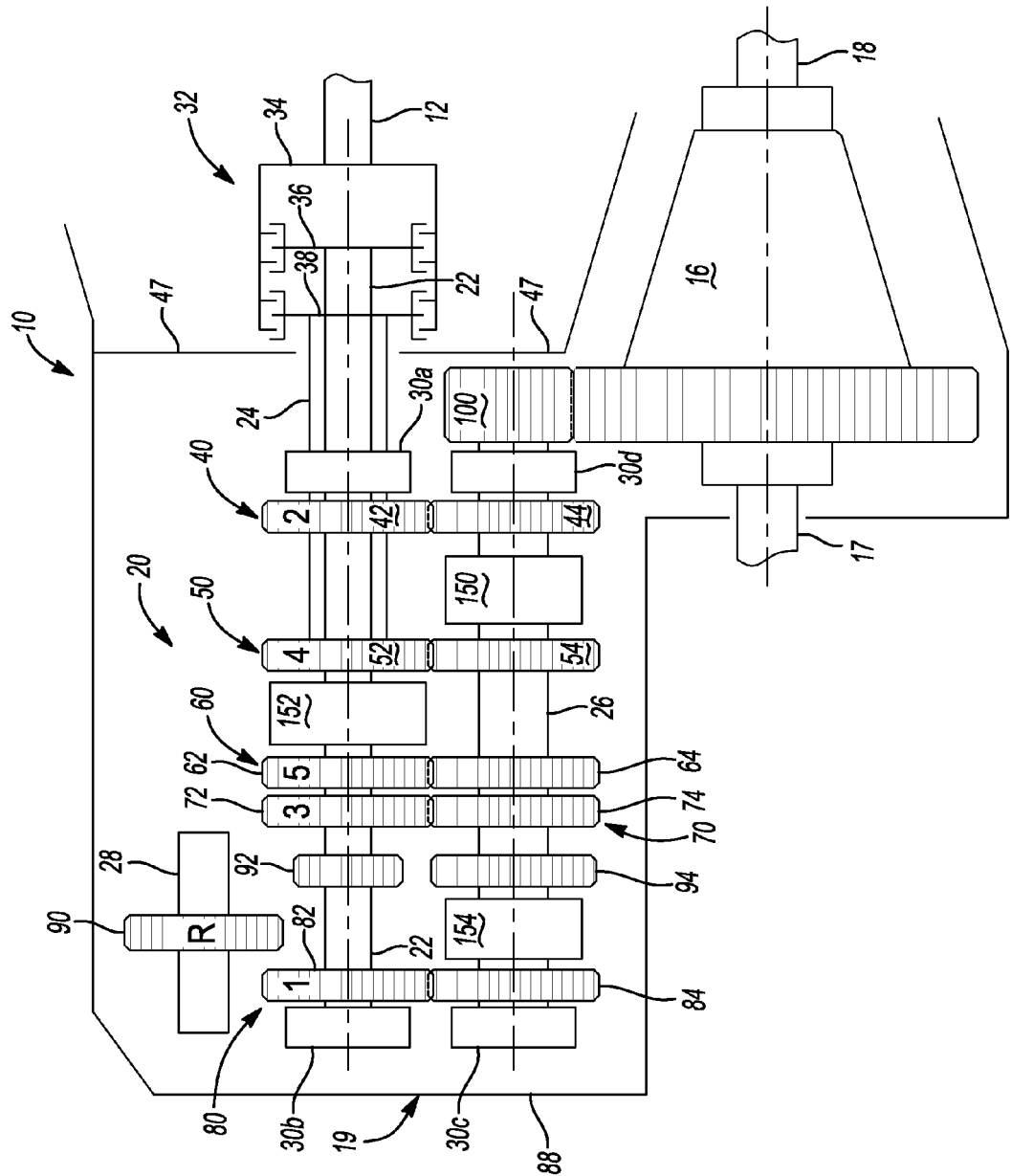

DUAL CLUTCH MULTI-SPEED TRANSMISSION HAVING ONE COUNTERSHAFT AND A REVERSE SHAFT

CROSS-REFERENCE TO RELATED APPLICATIONS

This application claims the benefit of U.S. Provisional Application No. 61/161,958, filed on Mar. 20, 2009, which is hereby incorporated in its entirety herein by reference.

TECHNICAL FIELD

The present disclosure relates to transmissions and more particularly to a compact, dual clutch multiple speed transmission having two axes to establish five or more forward gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, a countershaft member, a reverse shaft, a plurality of co-planar gear sets and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes five co-planar gear sets.

In yet another aspect of the present invention, the transmission includes three synchronizer assemblies.

In yet another aspect of the present invention, the three synchronizer assemblies include one one-way synchronizer and two two-way synchronizers.

In yet another aspect of the present invention, the transmission is operable to provide at least five forward speed ratios.

In yet another aspect of the present invention, a dual clutch transmission includes a transmission housing, six gear sets, a first and second transmission input member, a dual clutch assembly, a countershaft and three synchronizer assemblies.

In yet another aspect of the present invention, the first gear set has a first gear in mesh with a second gear. The second gear set has a first gear in mesh with a second gear. The third gear set includes a first gear in mesh with a second gear. The fourth gear set includes a first gear in mesh with a second gear. The fifth gear set includes a first gear in mesh with a second gear. The sixth gear set includes a first reverse gear, a second gear and a third gear. The reverse gear is configured to selectively mesh with both the first gear and the second gear of the sixth gear set.

In yet another aspect of the present invention, the first transmission input member is rotatably supported in the transmission housing. The first gear of the third gear set is selectively connectable for common rotation with the first transmission input member and each of the first gears of the fourth, fifth and sixth gear sets are rotatably fixed for common rotation with the first transmission input member.

In yet another aspect of the present invention, the second transmission input member is rotatably supported in the transmission housing. The first gear of the first and second gear sets are rotatably fixed for common rotation with the second transmission input member. The second transmission input member is concentric with the first transmission input member and at least partially surrounds the first transmission input member;

In yet another aspect of the present invention, the dual clutch assembly has a clutch housing connectable to an output of an engine, a first clutch configured to selectively connect the clutch housing to the first transmission input member and a second clutch configured to selectively connect the clutch housing to the second transmission input member. The clutch housing is rotationally supported within the transmission housing.

In yet another aspect of the present invention, the countershaft is rotatably supported within the transmission housing and spaced apart from and parallel with the first and second transmission input members. The second gears of the first, the second, the fourth and the fifth gear sets are each selectively connectable for common rotation with the countershaft and the second gears of the third and the sixth gear sets are each connected for common rotation with the countershaft.

In yet another aspect of the present invention, the reverse shaft is rotatably supported within the transmission housing and spaced apart from and parallel with the first and second transmission input members. The reverse shaft is configured for axial movement and the reverse gear of the sixth gear set is rotatably fixed for common rotation with the reverse shaft.

In yet another aspect of the present invention, the first synchronizer assembly is configured to selectively connect the second gear of the first gear set to the countershaft to establish a second gear ratio and to selectively connect the second gear of the second gear set to the countershaft to establish a fourth gear ratio when the second clutch of the dual clutch assembly is engaged to connect the clutch housing of the dual clutch to the second transmission input member.

In yet another aspect of the present invention, the second synchronizer is configured to selectively connect the first gear of the third gear set to the first transmission input member to establish a fifth gear ratio when the first clutch of the dual clutch assembly is engaged to connect the clutch housing of the dual clutch to the first transmission input member.

In yet another aspect of the present invention, a third synchronizer assembly is configured to selectively connect the second gear of the fifth gear set to the countershaft to establish a first gear ratio when the first clutch of the dual clutch assembly is engaged to connect the clutch housing of the dual clutch to the first transmission input member. The third synchronizer assembly is also configured to selectively connect the second gear of the fourth gear set to the countershaft to establish a third gear ratio when the first clutch of the dual clutch assembly is engaged to connect the clutch housing of the dual clutch to the first transmission input member.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a schematic diagram of an embodiment of a five speed transmission, in accordance with the present invention.

DESCRIPTION

Referring to FIG. 1, a multiple speed transmission is generally indicated by reference number 10. The transmission 10 is connectable to an input member 12 and includes an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine (not shown) or other torque producing machine to provide a driving torque to input member 12. For example, input member 12 is a flywheel or is connected to a flywheel of an engine. The output member or gear 14 rotatably drives a final drive assembly 16. The final drive assembly 16 transfers torque delivered by output member 14 to first and second side axles 17, 18, and on to road wheels (not shown) coupled to side axles 17, 18.

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first shaft or first transmission input member 22, a second shaft or second transmission input member 24, a countershaft 26 and a reverse shaft 28. The second shaft or member 24 is a sleeve shaft that is concentric with and overlies the first shaft or member 22. The countershaft 26 and the reverse shaft 28 are each spaced apart from and parallel with the first and second shaft members 22, 24. The first and second shafts 22, 24 define a first axis of rotation, the countershaft 26 defines a second axis of rotation for the gear sets that produce the forward gear speeds as will be described more fully hereinafter. Shaft members 22, 24, countershaft 26 are rotatably supported by bearings 30a, 30b, 30c and 30d.

A dual clutch assembly 32 is connected between the input member 12 and the first and second shaft members 22, 24. The dual clutch assembly 32 includes a clutch housing 34 that is connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34, respectively, have friction plates mounted thereon or otherwise coupled thereto that interact to form a friction clutch. The clutch element 36 is connected for common rotation with the first shaft or member 22 and the clutch element 38 is connected for common rotation with the second shaft or member 24. Thus, selective engagement of clutch element 36 with the clutch housing 34 connects the clutch housing 34 for common rotation with the first shaft member 22. Selective engagement of clutch element 38 with the clutch housing 34 connects clutch housing 34 for common rotation with the second shaft member 24.

The gearing arrangement 20 also includes a plurality of co-planar, meshing gear sets 40, 50, 60, 70 and 80. Co-planar gear set 40 includes gear 42 and gear 44. Gear 42 is rotatably fixed and connected for common rotation with the second shaft member 24. Gear 44 is selectively connectable for common rotation with the countershaft 26 and meshes with gear 42. It should be appreciated that gear 42 may be a separate gear structure fixed to the second shaft member 24 or gear teeth/splines formed on an outer surface of the second shaft member 24 without departing from the scope of the present invention. Gear set 40 is disposed adjacent a wall 47 of the transmission housing 19 that is on a front or side of the transmission 10 proximate the dual clutch assembly 32.

Co-planar gear set 50 includes gear 52 and gear 54. Gear 52 is rotatably fixed and connected for common rotation with the second shaft member 24 and meshes with gear 54. Gear 54 is selectively connectable for common rotation with the countershaft 26. Gear set 50 is positioned adjacent gear set 40.

Co-planar gear set 60 includes gear 62 and gear 64. Gear 62 is selectively connectable for common rotation with the first shaft member 22. Gear 64 is rotatably fixed and connected for common rotation with the countershaft 26 and meshes with gear 62. Gear set 60 is disposed adjacent gear set 50.

Co-planar gear set 70 includes gear 72 and gear 74. Gear 72 is rotatably fixed and connected for common rotation with the first shaft member 22 and meshes with gear 74. Gear 74 is selectively connectable for common rotation with the countershaft 26. Gear set 70 is positioned adjacent gear set 60.

Co-planar gear set 80 includes gear 82 and gear 84. Gear 82 is rotatably fixed and connected for common rotation with the first shaft member 22 and meshes with gear 84. Gear 84 is selectively connectable for common rotation with the countershaft 26. Gear set 80 is positioned between gear set 70 and an end wall 88 of the transmission housing 19.

Reverse gear 90 is rotatably fixed for common rotation with reverse shaft 28. Reverse shaft 28 is configured for axial movement. Reverse gear 90 may be selectively coupled to and placed in a meshing relationship with reverse drive gear 92 and reverse transfer gear 94 upon axial translation of reverse shaft 28. Reverse drive gear 92 is rotatably fixed for common rotation with first shaft member 22. Reverse transfer gear 94 is connected for common rotation with countershaft 26. Reverse gear 90 is located between gear set 70 and gear set 80. Reverse drive gear 92 is disposed between gear 72 and gear 82. Reverse transfer gear 94 is disposed between gear 74 and gear 84.

Further, a countershaft transfer gear 100 is rotatably fixed and connected for common rotation with the countershaft 26. Countershaft transfer gear 100 is configured to mesh with output member 14. The countershaft transfer gear 100 is disposed between the co-planar gear set 40 and end wall 47 of the transmission housing 19. The output member 14 is co-planar with countershaft transfer gears 100 and positioned between the gear set 40 and end wall 47 of the transmission housing 19.

The transmission 10 further includes a plurality of selectively engageable synchronizer assemblies 150, 152 and 154. Synchronizer 152 is a single sided synchronizer that generally includes a shift fork (not shown) that is bi-directionally translated by an actuator (not shown) into either an engaged position or a neutral or disengaged position. In the present embodiment, synchronizer 152 is selectively actuatable to connect gear 62 for common rotation with the first shaft member 22. In a preferred embodiment, synchronizer 152 would have only one actuator.

Synchronizers 150 and 154 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect for common rotation gear 44 with the countershaft 26 and is selectively actuatable to connect for common rotation gear 54 with the countershaft 26. Synchronizer 154 is selectively actuatable to connect gear 74 for common rotation with the countershaft 26 and is selectively actuatable to connect gear 84 for common rotation with the countershaft 26. In an embodiment of the present invention, gear 94 is integrated into synchronizer 154 which allows synchronizer 154 access to gear 74 to couple gear 74 to countershaft 26.

The transmission 10 is capable of transmitting torque from the input shaft 12 to the output gear member 14 in at least five forward torque ratios and at least one reverse torque ratio. Each of the forward torque ratios and the reverse torque ratio is attained by selective engagement of the dual clutch assembly 32, one or more of the synchronizer assemblies 150, 152 and 154, or the actuation of the reverse shaft 28. Those skilled in the art will readily understand that a different speed ratio is associated with each torque ratio.

It should be appreciated that each individual gear set 40, 50, 60, 70, 80 and gear 90 provides one or more forward and/or reverse gear ratios upon selective engagement of the synchronizer assemblies 150, 152 and 154 or the positioning of the reverse shaft 28. It should also be appreciated that a particular forward or reverse speed ratio may be achieved by different combinations of synchronizer and associated gear sets without departing from the scope of the present invention.

For example, to establish the reverse torque ratio, clutch element 36 is engaged, reverse shaft 28 is axially translated to couple or mesh reverse gear 90 with reverse drive gear 92 and reverse transfer gear 94. Clutch element 36 couples the clutch housing 34 with the first shaft member 22. The axially translated reverse shaft 28 couples reverse gear 90 to reverse drive gear 92. Thus, reverse drive gear 92 transfers driving torque to reverse gear 90. Reverse gear 90 which is also in mesh with reverse transfer gear 94 transfers torque to the reverse transfer gear 94. Reverse transfer gear 94 transfers torque to countershaft 26. Countershaft 26 transfers the torque to the countershaft transfer gear 100 and the countershaft transfer gear 100 transfers the torque to the output member 14.

To establish a first forward torque ratio (i.e. a 1st gear), clutch element 36 is engaged and synchronizer 154 is activated. Clutch element 36 couples clutch housing 34 with the first shaft member 22. Synchronizer 154 couples gear 84 to the countershaft 26. Input torque from the input member 12 is transferred through the dual clutch assembly 32 to the first shaft member 22 to gear 82. Gear 82 transfers torque to gear 84 which transfers the torque to the countershaft 26 through synchronizer 154 and to countershaft transfer gear 100 and then from countershaft transfer gear 100 to the output member 14.

To establish a second forward torque ratio (i.e. a 2nd gear), clutch element 38 is engaged and synchronizer 150 is activated. Clutch element 38 couples the clutch housing 34 to the second shaft member 24 which rotates gear 42. Synchronizer 150 couples gear 44 to the countershaft 26. Accordingly, input torque from the input member 12 is transferred through the dual clutch assembly 32 to the second shaft member 24, through gear 42 to gear 44, from gear 44 to synchronizer 150, from synchronizer 150 to the countershaft 26 and from the countershaft transfer gear 100 to the output member 14.

To establish a third forward torque ratio (i.e. a 3rd gear), clutch element 36 is engaged and synchronizer 154 is activated. Clutch element 36 couples the input member 12 to the first shaft member 22 which rotates gear 72. Synchronizer 154 couples gear 74 to the countershaft 26. Thus, input torque from the input member 12 is transferred through the dual clutch assembly 32 to the first shaft member 22 to gear 72, from gear 72 to gear 74, through gear 74 to synchronizer 154, from synchronizer 154 to the countershaft 26, from the countershaft 26 to the countershaft transfer gear 100 and then from countershaft transfer gear 100 to the output member 14.

To establish a fourth forward torque ratio (i.e. a 4th gear), clutch element 38 is engaged and synchronizer 150 is activated. Clutch element 38 couples the clutch housing 34 to the second shaft member 24 which rotates gear 52. Synchronizer 150 couples gear 54 to the countershaft 26. Thus, input torque from the input member 12 is transferred through the dual clutch assembly 32 to the shaft member 24 to gear 52, then from gear 52 to gear 54, from gear 54 to synchronizer 150, from synchronizer 150 to the countershaft 26, from countershaft 26 to countershaft transfer gear 100 and then from countershaft transfer gear 100 to the output member 14.

To establish a fifth forward torque ratio (i.e. a 5th gear), clutch element 36 is engaged and synchronizer 152 is activated. Clutch element 36 couples the clutch housing 34 to the first shaft member 22. Synchronizer 152 couples gear 62 to the first shaft member 22. Input torque from the input member 12 is transferred through the dual clutch assembly 32 to the first shaft member 22, from first shaft member 22 to gear 62 through synchronizer 152, from gear 62 to gear 64, from gear 64 to the countershaft 26, from countershaft 26 to countershaft transfer gear 100 and from countershaft transfer gear 100 to the output member 14

Again, it should be appreciated that any one of the gear sets of gear sets 40, 50, 60, 70, 80 and gear 90 may be changed to produce a certain forward and reverse torque ratio without departing from the scope of the present invention.

The present invention contemplates that a variety of torque ratios (i.e., the ratio of torque of the output member 14 to the input member 12) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a transmission housing;
   a dual clutch assembly having a clutch housing connectable to a flywheel of an engine, wherein the clutch housing is rotationally supported within the transmission housing;
   a first, second, third, fourth, fifth and sixth gear set, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear and a sixth gear set includes a first reverse gear, a second gear and a third gear, wherein the reverse gear is configured to selectively mesh with both the first gear and the second gear of the sixth gear set;

a first transmission input member rotatably supported in the transmission housing and wherein the first gear of the third gear set is selectively connectable for common rotation with the first transmission input member and each of the first gears of the fourth, fifth and sixth gear sets are rotatably fixed for common rotation with the first transmission input member;

a second transmission input member rotatably supported in the transmission housing, wherein the first gear of the first and second gear sets are rotatably fixed for common rotation with the second transmission input member and wherein the second transmission input member is concentric with the first transmission input member and at least partially surrounds the first transmission input member;

a countershaft rotatably supported within the transmission housing and spaced apart from and parallel with the first and second transmission input members, wherein the second gears of the first, the second, the fourth, and the fifth gear sets are each selectively connectable for common rotation with the countershaft and the second gears of the third and the sixth gear sets are each connected for common rotation with the countershaft;

a reverse shaft rotatably supported within the transmission housing and spaced apart from and parallel with the first and second transmission input members, wherein the reverse shaft is configured for axial movement and the reverse gear of the sixth gear set is rotatably fixed for common rotation with the reverse shaft; and three synchronizer assemblies for selectively coupling at least one of the gears of the first, second, third, fourth and fifth sets with at least one of the first and second transmission input members and the countershaft, and wherein the selective engagement of dual clutch assembly interconnects the dual clutch housing with at least one of the first and the second transmission input members and the selective engagement of at least one of the three synchronizer assemblies establishes at least one of five forward speed ratios.

2. The transmission of claim 1 wherein the first of the three synchronizer assemblies selectively connects at least one of the second gear of the first gear set and the second gear of the second gear set to the countershaft shaft.

3. The transmission of claim 2 wherein the second of the three synchronizer assemblies selectively connects the first gear of the third gear set to the first transmission input member.

4. The transmission of claim 3 wherein the third of the three synchronizer assemblies selectively connects at least one of the second gear of the fifth gear set and the second gear of the fourth gear set to the countershaft.

5. The transmission of claim 1 wherein the first gear set is adjacent the dual clutch assembly, the second gear set is adjacent the first gear set, the third gear set is adjacent the second gear set, the fourth gear set is adjacent the third gear set, the sixth gear set is adjacent the fourth gear set and the fifth gear set is disposed between an end wall of the transmission housing and the sixth gear set.

6. The transmission of claim 1 wherein the dual clutch assembly includes a first clutch and a second clutch, wherein the second clutch is configured to selectively connect the clutch housing to the second transmission input member and wherein the three synchronizer assemblies includes a first synchronizer assembly for selectively connecting the second gear of the first gear set to the countershaft to establish a second gear ratio.

7. The transmission of claim 6 wherein the second clutch of the dual clutch assembly is configured to selectively connect the clutch housing to the second transmission input member and wherein the first synchronizer of the three synchronizer assemblies is configured to selectively connect the second gear of the second gear set to the countershaft to establish a fourth gear ratio.

8. The transmission of claim 6 wherein the first clutch of the dual clutch assembly is configured to selectively connect the clutch housing to the first transmission input member and wherein the reverse shaft is configured for axial movement to selectively engage the reverse gear with both the first and second gears of the sixth gear set to establish a reverse gear ratio.

9. The transmission of claim 6 wherein the first clutch of the dual clutch is configured to selectively connect the clutch housing to the first transmission input member and wherein the second synchronizer assembly of the three synchronizer assemblies is configured to selectively connect the first gear of the third gear set to the first transmission input member to establish a fifth gear ratio.

10. The transmission of claim 9 wherein the first clutch of the dual clutch is configured to selectively connect the clutch housing to the first transmission input member and wherein the third synchronizer assembly of the three synchronizer assemblies is configured to selectively connect the second gear of the fourth gear set to the countershaft to establish a third gear ratio.

11. The transmission of claim 10 wherein the first clutch of the dual clutch is configured to selectively connect the clutch housing to the first transmission input member and wherein the third synchronizer assembly of the three synchronizer assemblies is configured to selectively connect the second gear of the fifth gear set to the countershaft to establish a first gear ratio.

12. The transmission of claim 1 further comprising a countershaft transfer gear fixed to the countershaft for common rotation with the countershaft and wherein the countershaft transfer gear transfers torque from the countershaft to the output member.

13. The transmission of claim 12 wherein the output member is a gear that meshes with the countershaft transfer gear.

14. A dual clutch transmission comprising:
a transmission housing;
a first, second, third, fourth, fifth and sixth gear set, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear and a sixth gear set includes a first reverse gear, a second gear and a third gear, wherein the reverse gear is configured to selectively mesh with both the first gear and the second gear of the sixth gear set;

a first transmission input member rotatably supported in the transmission housing and wherein the first gear of the third gear set is selectively connectable for common rotation with the first transmission input member and each of the first gears of the fourth, fifth and sixth gear sets are rotatably fixed for common rotation with the first transmission input member;

a second transmission input member rotatably supported in the transmission housing, wherein the first gear of the first and second gear sets are rotatably fixed for common rotation with the second transmission input member and wherein the second transmission input member is concentric with the first transmission input member and at least partially surrounds the first transmission input member;

a dual clutch assembly having a clutch housing connectable to an output of an engine, a first clutch configured to selectively connect the clutch housing to the first transmission input member and a second clutch configured to selectively connect the clutch housing to the second transmission input member and wherein the clutch housing is rotationally supported within the transmission housing;

a countershaft rotatably supported within the transmission housing and spaced apart from and parallel with the first and second transmission input members, wherein the second gears of the first, the second, the fourth and the fifth gear sets are each selectively connectable for common rotation with the countershaft and the second gears of the third and the sixth gear sets are each connected for common rotation with the countershaft;

a reverse shaft rotatably supported within the transmission housing and spaced apart from and parallel with the first and second transmission input members, wherein the reverse shaft is configured for axial movement and the reverse gear of the sixth gear set is rotatably fixed for common rotation with the reverse shaft; and a first synchronizer assembly configured to selectively connect the second gear of the first gear set to the countershaft to establish a second gear ratio and to selectively connect the second gear of the second gear set to the countershaft to establish a fourth gear ratio when the second clutch of the dual clutch assembly is engaged to connect the clutch housing of the dual clutch to the second transmission input member;

a second synchronizer configured to selectively connect the first gear of the third gear set to the first transmission input member to establish a fifth gear ratio when the first clutch of the dual clutch assembly is engaged to connect the clutch housing of the dual clutch to the first transmission input member; and a third synchronizer assembly configured to selectively connect the second gear of the fifth gear set to the countershaft to establish a first gear ratio when the first clutch of the dual clutch assembly is engaged to connect the clutch housing of the dual clutch to the first transmission input member and wherein the third synchronizer assembly is configured to selectively connect the second gear of the fourth gear set to the countershaft to establish a third gear ratio when the first clutch of the dual clutch assembly is engaged to connect the clutch housing of the dual clutch to the first transmission input member.

15. The transmission of claim 14 wherein the first gear set is adjacent the dual clutch assembly, the second gear set is adjacent the first gear set, the third gear set is adjacent the second gear set, the fourth gear set is adjacent the third gear set, the sixth gear set is adjacent the fourth gear set and the fifth gear set is disposed between an end wall of the transmission housing and the sixth gear set.

16. The transmission of claim 14 further comprising a countershaft transfer gear fixed to the countershaft for common rotation with the countershaft and wherein the countershaft transfer gear transfers torque from the countershaft to the output member.

17. The transmission of claim 16 wherein the output member is a gear that meshes with the countershaft transfer gear.

18. The transmission of claim 14 wherein second gear of the sixth gear set is integrally formed with the third synchronizer assembly.

* * * * *